United States Patent [19]
Abe

[11] Patent Number: 5,367,696
[45] Date of Patent: Nov. 22, 1994

[54] REGISTER ALLOCATION TECHNIQUE IN A PROGRAM TRANSLATING APPARATUS

[75] Inventor: Hitoshi Abe, Kanagawa, Japan

[73] Assignee: Fuji Xerox Co., Ltd., Tokyo, Japan

[21] Appl. No.: 769,446

[22] Filed: Oct. 1, 1991

[30] Foreign Application Priority Data

Dec. 7, 1990 [JP] Japan .................. 2-407393

[51] Int. Cl.[5] ............................... G06F 15/20
[52] U.S. Cl. ................. 395/800; 364/247; 364/280.4; 364/280.5; 364/281.3; 364/DIG. 1; 395/700; 395/650
[58] Field of Search ............ 395/500, 800, 425, 650, 395/700

[56] References Cited

U.S. PATENT DOCUMENTS

| | | | |
|---|---|---|---|
| 4,571,678 | 2/1986 | Chaitin | 395/700 |
| 4,782,444 | 11/1988 | Munshi | 395/700 |
| 4,802,091 | 1/1989 | Cocke | 395/700 |
| 4,953,084 | 8/1990 | Meloy | 371/19 |
| 5,193,190 | 3/1993 | Janczyn | 395/700 |
| 5,249,295 | 9/1993 | Briggs | 395/650 |

OTHER PUBLICATIONS

G. J. Chaitin, M. A. Auslander, A. K. Chander, J. Cocke, M. E. Hopkins and P. W. Markstein, "Register Allocation via Coloring", Computer Language 6, pp. 47–57, 1981.

"Allocation by Priority-based Coloring", Proceedings of the ACMSIGPLAN Symposium on Compiler Construction, pp. 222–232 (Jun. 17–22, 1984).

*Primary Examiner*—Eric Coleman
*Attorney, Agent, or Firm*—Finnegan, Henderson, Farabow, Garrett & Dunner

[57] ABSTRACT

A program translating apparatus includes a detection portion, a separation portion, a register allocation portion, and a register assignment portion. All ranges of existence of variables are separated at starting points and ending points, profits are calculated in cases where split regions of the ranges of existence are respectively allocated to registers, and a priority for register allocation of the respective split regions is calculated. The register allocation/assignment is performed on the basis of the obtained priority.

5 Claims, 15 Drawing Sheets

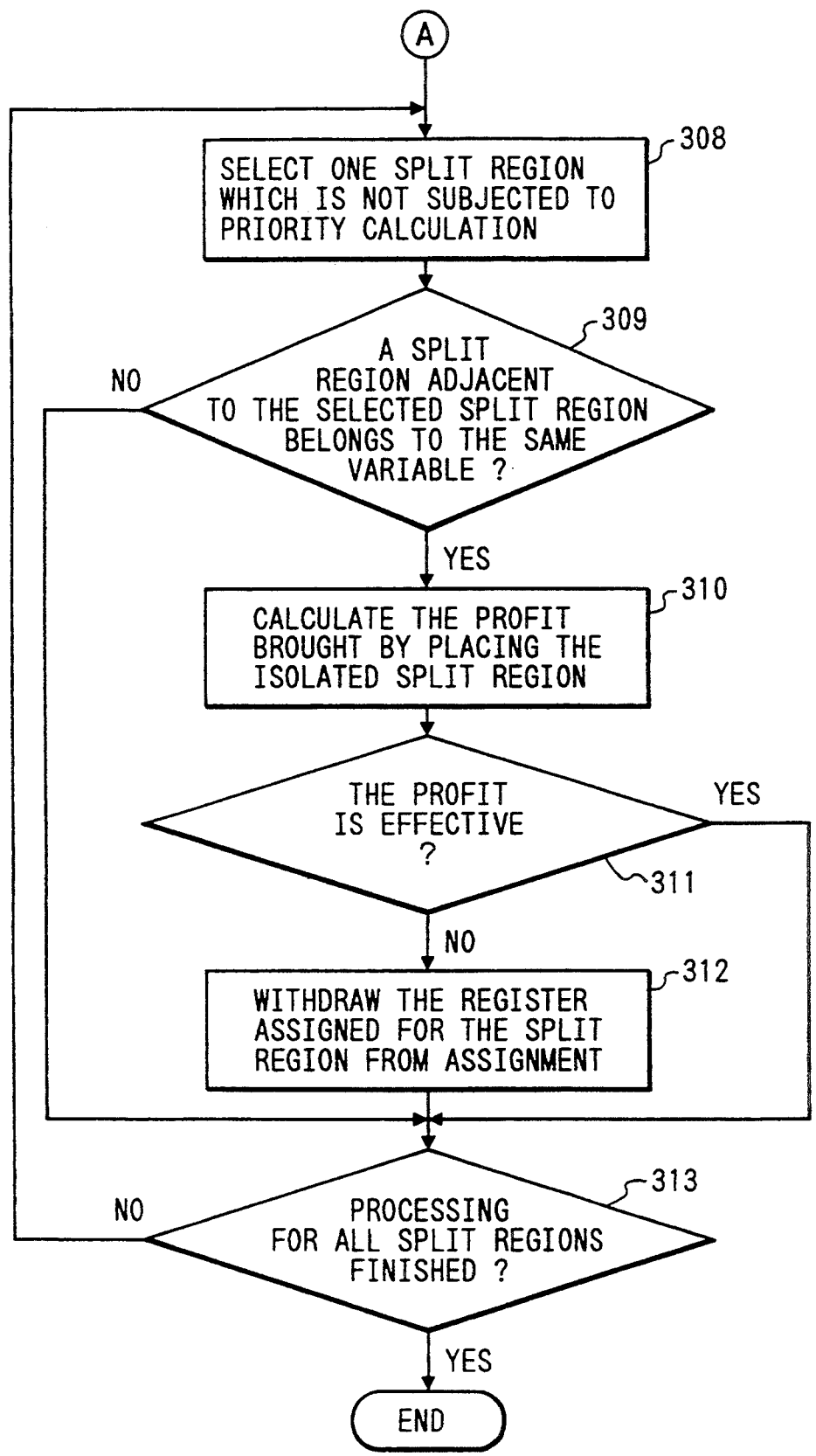

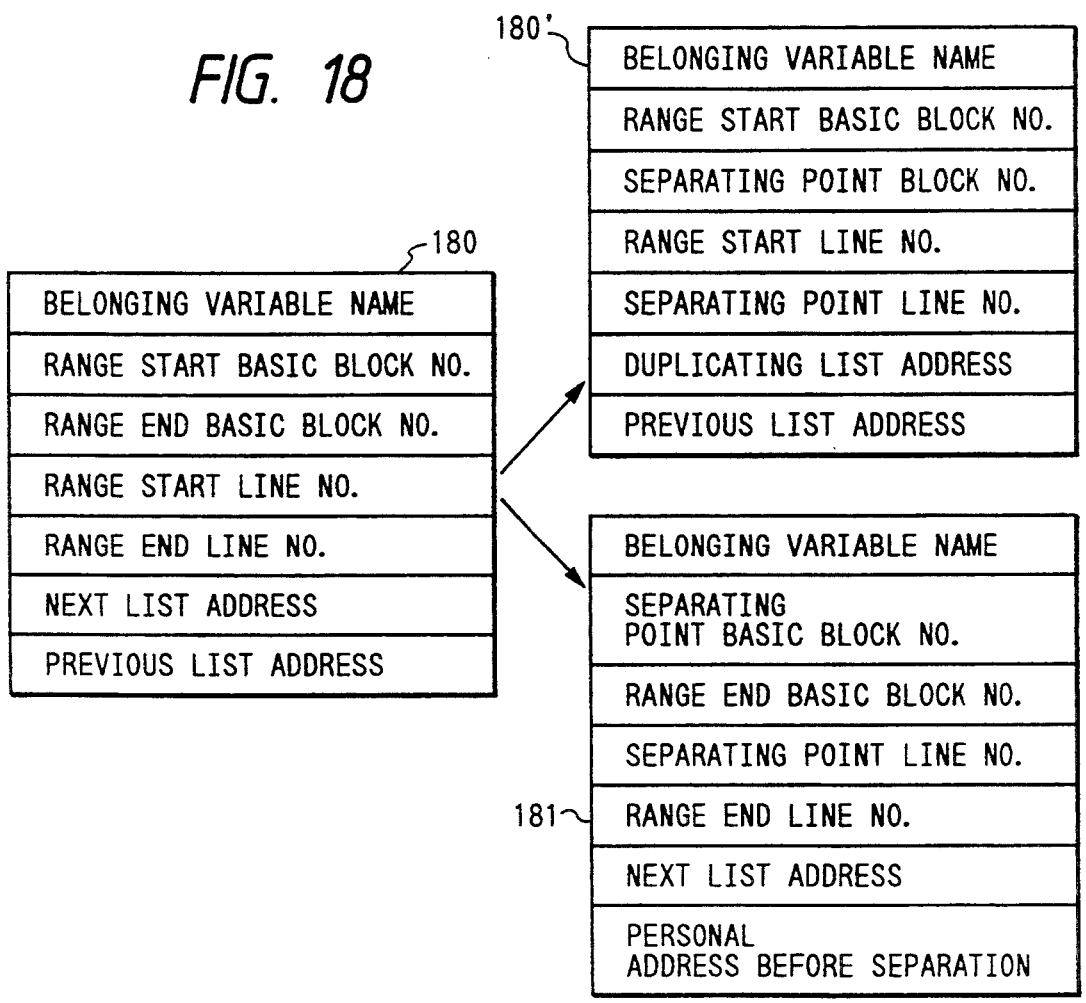

REGISTER ALLOCATION TECHNIQUE IN A PROGRAM TRANSLATING APPARATUS

BACKGROUND OF THE INVENTION

1. Field of the Invention

The present invention relates to a program translating apparatus in a computer having a limited and finite number of registers. In particular, the present invention relates to register allocation in a program translating process adapted to a compiler or an interpreter.

2. Description of the Related Art

A register allocation technique using a graphically coloring method as described in Reference 1 (G. J. Chaitin, M. A. Auslander, A. K. Chander, J. Cocke, M. E. Hopkins and P. W. Markstein, "Register Allocation via Coloring", Computer Language 6, pp. 47-37 (1981)) is one of register allocation techniques on conventional compilers. This type of technique performs register allocation through a process in which an interference graph is generated on the basis of judgment as to whether registers interfere with one another over all the ranges of existence thereof. Each node of the interference graph is colored to form one-to-one correspondence between colors and registers actually existing. Therefore, a case where some registers cannot be allocated, though an allocatable range actually exists in the register, often occurs because the range of existence of a variable cannot be completely put in the allocatable range. There arises a disadvantage in that object codes generated are poor in efficiency. Although the time required for computing is relatively short if the number of registers is sufficient, the overhead required for re-computing becomes very large because the number of nodes of the interference graph as subjects of register allocation must be reduced by insertion of "spill" codes if the number of registers which can be used is insufficient.

According to an allocation technique as described in Reference 2 ("Allocation by Priority-based Coloring", Proceedings of the ACMSIGPLAN Symposium on Compiler Construction, pp. 222-232 (Jun. 17-22, 1984)), the disadvantage of the technique of the above Reference 1 is eliminated by separating the range of existence of a variable impossible of attaining of thorough coloring into ranges existence in the case where coloring based on a limited number of colors on the interference graph is impossible. The technique of the Reference 2, however, has a disadvantage in that a long time is required for reconstructing a new interference graph by adding nodes corresponding to the newly allocated ranges of existence of the variable to the original interference graph and for performing re-computing of priority, coloring and the like on the basis of the new interference graph. In particular, with respect to a range of existence which is low in priority such that it cannot be allocated to the last, wasteful separation is repeated. Further, in the technique of the Reference 2, a loop is used as a subject of weighing when priority is computed. There is, however, a difference in frequency of use between basic blocks based on condition branches (conditional jumps) in actual source codes. Accordingly, the case where priority cannot be correctly computed often occurs.

According to a technique described in Japanese Patent Unexamined Publication No. Hei. 1-103742, the problem in the above Reference 2 is solved by computing the priority of the ranges of existence so as to be nearer to the approximation of the frequency in use under the consideration of conditional branches (conditional jumps) in conditional statements (if statements) while separating exclusively the ranges of existence as subjects of allocation on the basis of the technique of the Reference 2 to suppress the increase in the computing time due to wasteful separation.

In any one of the aforementioned techniques, a range of existence of a variable is totally allocated to a register if the register can be allocated for the whole range of existence of the variable, and the efficiency in codes generated based on the existence of the variable in the register is better than the efficiency in codes generated based on the existence of the variable in a memory. For this reason, a part of a range of existence which is low in frequency in use occupies one register in the case where there is a difference in frequency in use between parts of the range of existence. There arises a disadvantage in that optimum codes cannot be always generated.

SUMMARY OF THE INVENTION

An object of the present invention is to eliminate the disadvantages in the conventional technique and improve the conventional techniques. In other words, an object of the present invention is to perform register allocation based on the actual frequency in use to thereby improve the executing efficiency in generated codes and prevent the overhead of re-computing caused by the generation of "spill" codes.

In order to attain the above object, according to an aspect of the present invention, the program translating apparatus comprises: detection means for detecting starting points and end points in ranges of existence of variables existing in the same period of time through examining the ranges of existence of the variables one by one; separation means for separating the ranges of existence of the variables at the starting points and end points detected by the detection means; register allocation means for selecting candidatures for split regions permanently allocated to registers through calculating profits in the case where the split regions obtained by separating the ranges of existence of the variables that are different and existing in the same period of time by the separation means are respectively allocated to the registers; and register assignment means for permanently assigning registers for the candidatures for the split regions selected by the register allocation means.

BRIEF DESCRIPTION OF THE DRAWINGS

FIG. 16 is a flowchart showing the continuation of the register assignment procedure of FIG. 15;

FIG. 17 is a view showing a list of existence range information used in execution of the optimization compiler in the first embodiment;

FIG. 18 is a view for explaining the separation of the list of existence range information at the time of separating ranges of existence;

DETAILED DESCRIPTION OF THE PREFERRED EMBODIMENTS

First, the present invention will be described conceptually.

Figure 2:
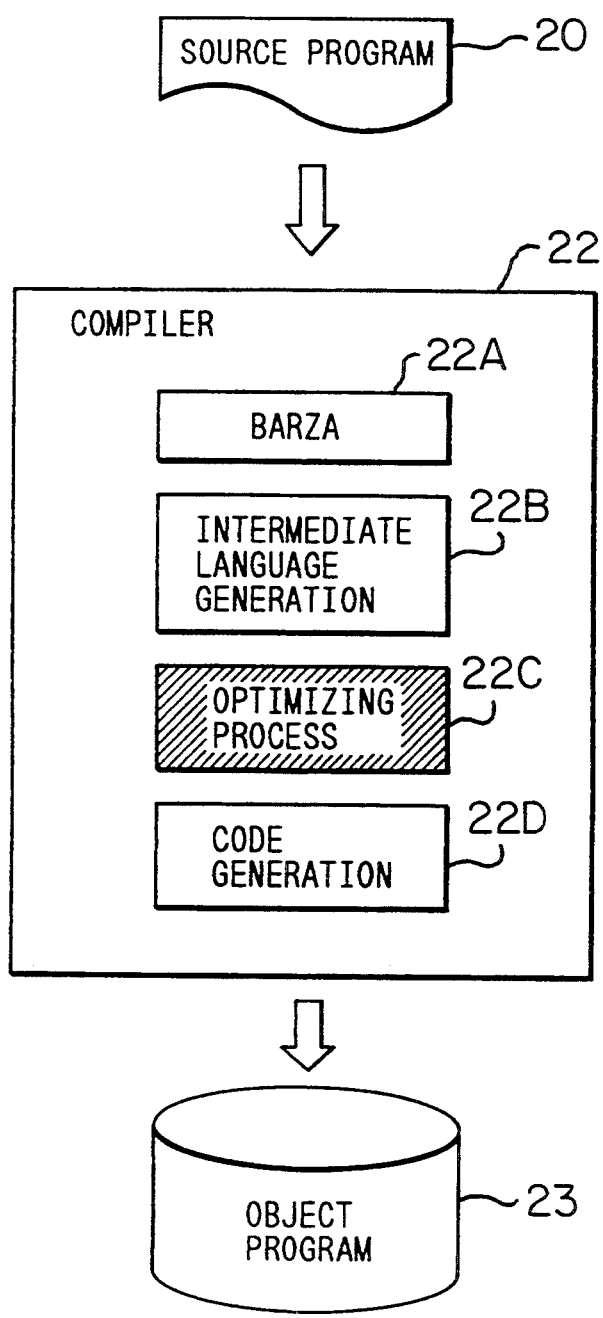
FIG. 2 is a view showing a procedure in an optimization compiler.

FIG. 2 illustrates an optimization compiler procedure of the present invention. From the source program 20 is compiled in compiler 22 to produce the object program 23. The compiler 22 includes barza 22A, intermediate language generation unit 22B optimizing process unit 22C and code generation unit 22D.

The program translating apparatus according to the present invention includes: a detection portion (11 in FIG. 1) for detecting starting points and end points in ranges of existence of variables existing in the same period of time through examining the ranges of existence of the variables one by one; a separation portion (12 in FIG. 1) for separating the ranges of existence of the variables at the starting points and end points detected by the detection portion; a register allocation portion (13 in FIG. 1) for selecting candidatures for split regions permanently allocated to registers through calculating profits in the case where the split regions obtained by separating the ranges of existence of the variables, being different and existing in the same period of time by the separation portion, are respectively allocated to the registers; and a register assignment portion (14 in FIG. 1) for permanently assigning registers for the candidatures of the split regions selected by the register allocation portion.

Figure 3:
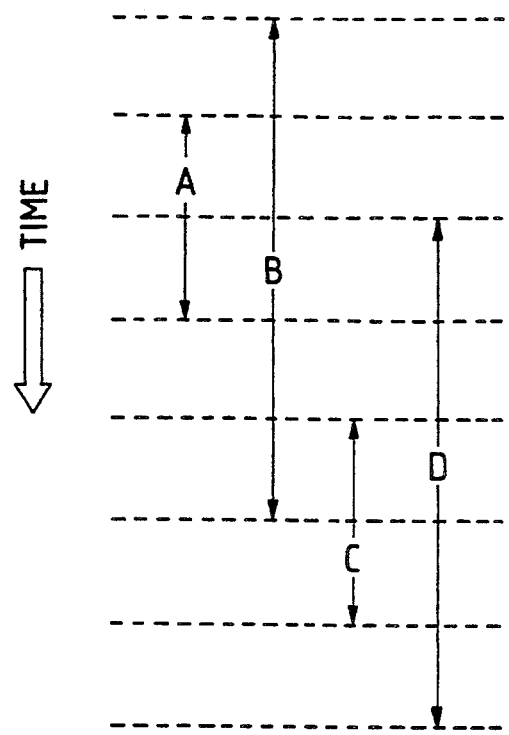
FIGS. 3 through 6 are conceptual diagrams each showing the outline of a process in the present invention.

Ranges of existence of respective variables analyzed by the detection portion (11 in FIG. 1) are shown in FIG. 3 in which the ordinate represents time, and the abscissa represents variable. In FIG. 3, four variables A, B, C and D are shown.

Figure 4:
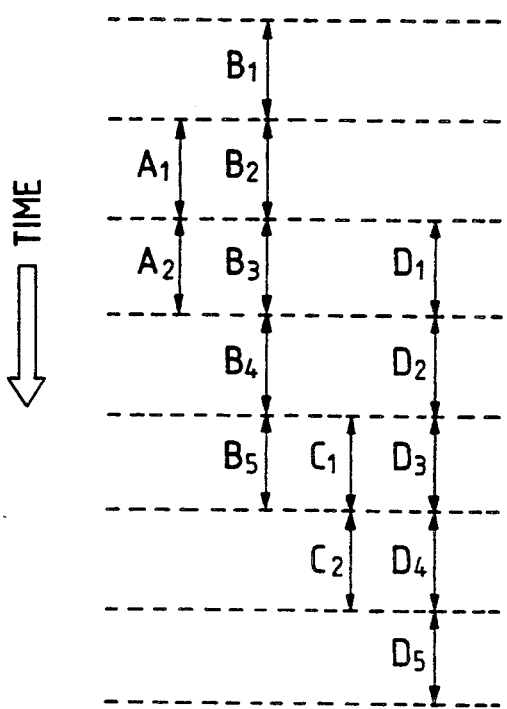

Broken lines in FIG. 3 indicate starting points and end points in the ranges of existence of the respective variables recorded. The results of separating the range of existence of each variable by the starting points and the end points of the ranges of existence of the other variables by the separation portion (12 in FIG. 1) are shown in FIG. 4. The respective split regions are expressed by the original names of the variables and subscripts showing split region numbers.

Figure 5:
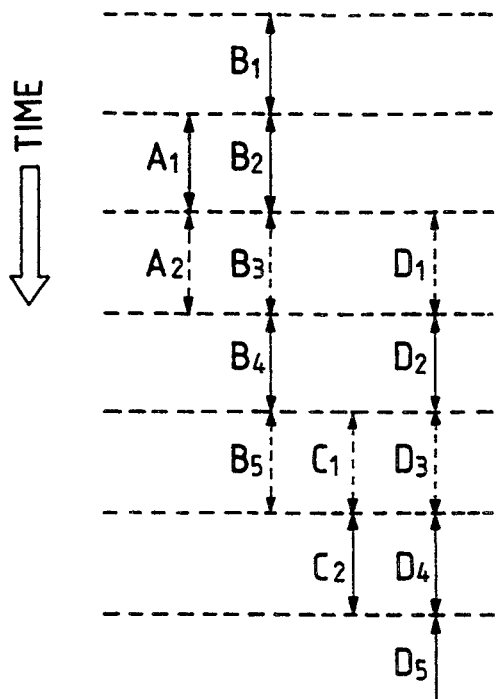

In FIG. 5, the solid lines indicate split regions of the ranges of existence of the respective variables as candidatures for register allocation, and the broken lines indicate other split regions of the ranges of existence which are not yet allocated.

The register allocation portion (13 in FIG. 1) calculates profits in the case where the unallocated regions are respectively allocated to registers, on the basis of the aforementioned information. That is, for example, the register allocation portion calculates the sum of the cost based on the necessity of loading a variable from a variable memory onto a register, the cost based on the necessity of storing the variable from the register into the memory, and the total profit obtained by multiplying a referring-time profit in the case of placing the variable on the register compared with the case of placing the variable in the memory by the number of times of reference in the split region.

In the case where the number of split regions of the ranges of existence of the respective variables existing simultaneously is smaller than the number of registers allowed to be used, the split existence ranges are automatically employed as candidatures for register allocation. In this case, the priority calculation is omitted.

The register allocation portion (13) decides priority on the basis of the profits thus obtained, selects the split regions of the unallocated existence ranges as candidatures permanently allocated to registers and decides the split regions of the existence ranges as all candidatures for register allocation.

Figure 6:
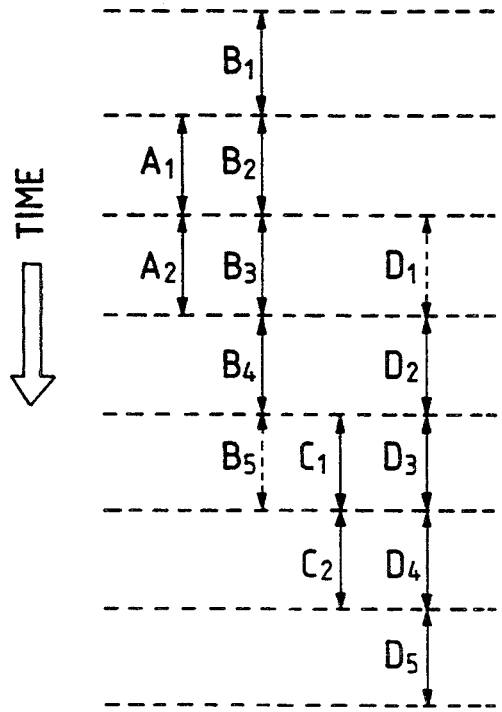

The register assignment portion (14) assigns the split regions of the variables to registers existing sequentially. Although it has been already decided that one register is necessarily allocated for the respective split regions of the separated existence range remaining as a candidature, it has not been decided yet which register will be employed. Accordingly, the split regions of the same variable are assigned successively such that they can be allocated to one register as possible. FIG. 6 shows an example of the results of assignment.

The register allocation based on the actual frequency in use can be performed by deciding priority of split regions after separating the ranges of the respective variables in advance, as compared with the conventional techniques. Accordingly, the efficiency in execution of generated codes can be improved and the overhead of re-computing caused by the generation of "spill" codes, for example, can be prevented.

FIG. 2 shows a procedure of executing a translating program in a general program translating apparatus (compiler) for translating a source program into an object program. The program translating apparatus is constructed as a computer system (as shown in FIG. 7) for executing a compiler program.

Figure 7:
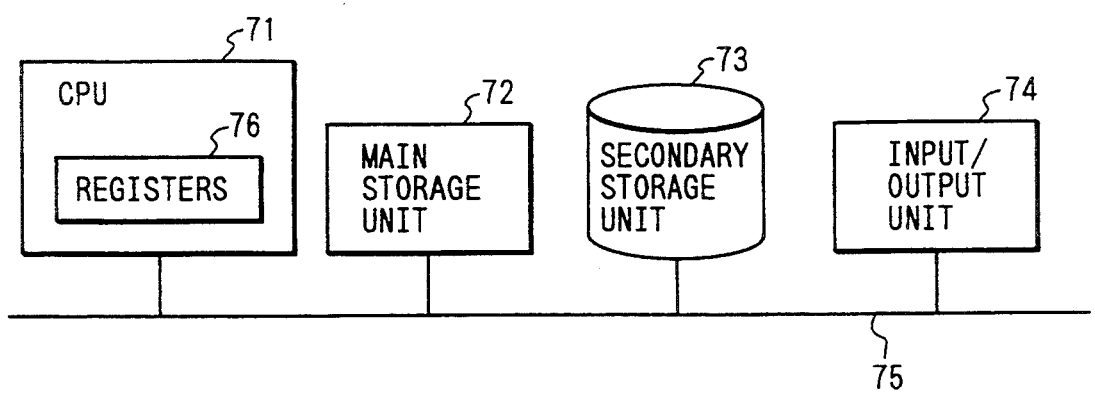
FIG. 7 is a block diagram of a system for executing the optimization compiler in the first embodiment of the present invention and for executing the object program output.

Execution of the object codes generated by this translating apparatus is carried out in the computer system as shown in FIG. 7.

Figure 8:
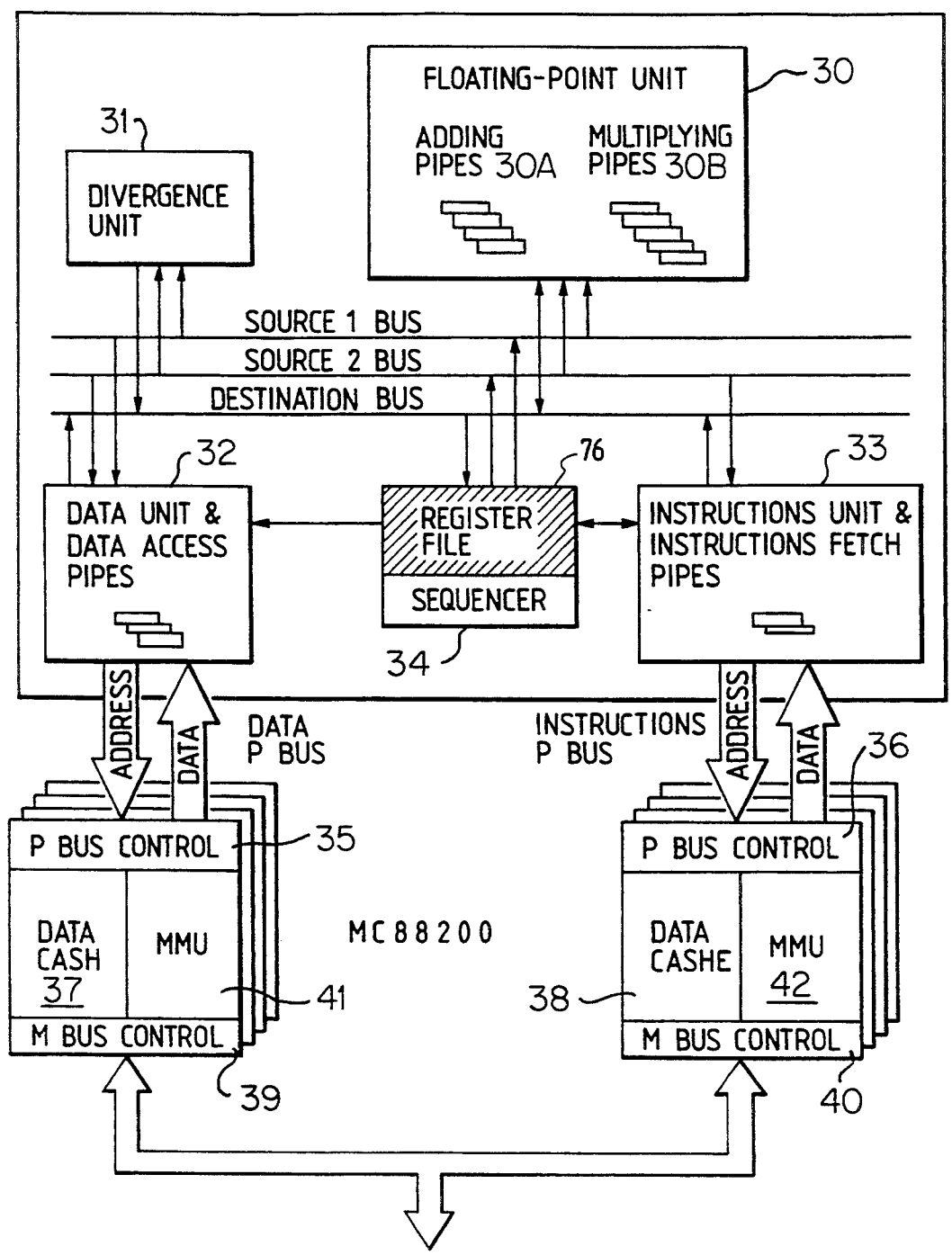
FIG. 8 is a block diagram showing an example of a CPU used in the system of FIG. 7.

As shown in FIG. 7, the computer system comprises a central processing unit (CPU) 71, registers 76, a main storage unit 72, a secondary storage unit 73 such as a magnetic disc or the like, an input/output unit 74 such as a keyboard, a mouse or the like, and an inner bus 75. As an example of the CPU in FIG. 7, the configuration of an RISC processor MC88200 made by Motorola, Inc. is shown in FIG. 8. In this example, the processor has registers as the register files 76.

The RISC processor MC88200 in FIG. 8 includes floating point unit 30 with adding pipes 30A and multiplying pipes 30B, divergence unit 31, data unit and data access pipes 32, instructions unit and instructions fetch pipes 33, sequencer 34, register file 76, P bus control 35 and 36, data cache 37 and 38, memory management unit (MMU) 41 and 42, and M bus control 39 and 40.

Because the registers 76 exist within the CPU 71 and have the benefit of very large scale integration technique, the access time required is very short as compared with the main storage unit 72. To improve the efficiency in execution of the generated object codes by using this characteristic is to optimize the register allocation on the compiler. The present invention particularly relates to such an optimizing process.

FIRST EMBODIMENT

An embodiment of the present invention will be described hereunder with reference to the drawings.

Figure 1:
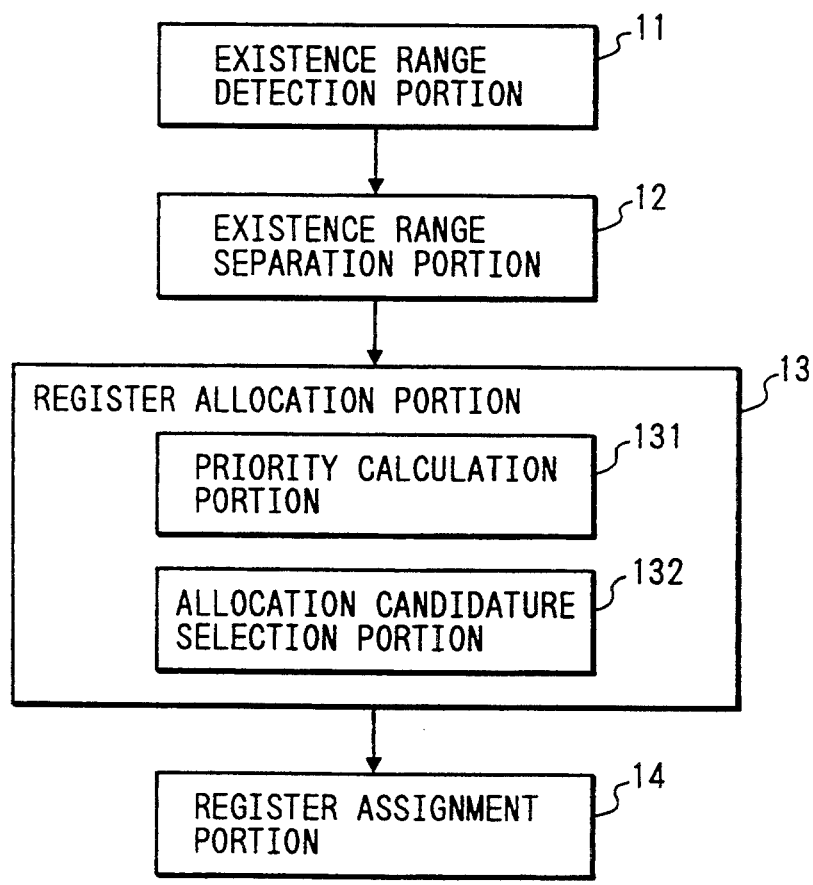
FIG. 1 is a block diagram showing the configuration of a first embodiment of the present invention.

As shown in FIG. 1, the translating apparatus in this embodiment has an existence range detection portion 11, an existence range separation portion 12, a register allocation portion 13 including a priority calculation portion 131 and an allocation candidature selection portion 132, and a register assignment portion 14.

The operation of the translating apparatus will be described hereunder with reference to flowcharts.

Figure 9:
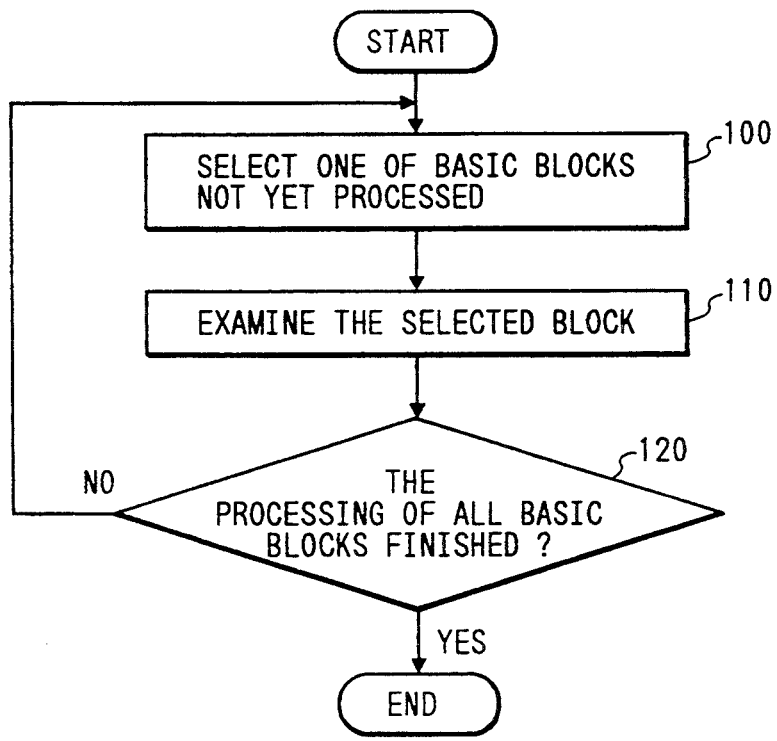
FIG. 9 is a flowchart showing the outline of a procedure for analyzing ranges of existence.

First, the existence range detection portion 11 analyzes ranges of existence according to the flowchart shown in FIG. 9.

As shown in FIG. 9, the existence range detection portion 11 selects one of basic blocks not yet processed (Step 100), examines existence range information in the selected block (Step 110), and repeats the aforementioned steps until the processing of all basic blocks is finished (Step 120).

Figure 10:
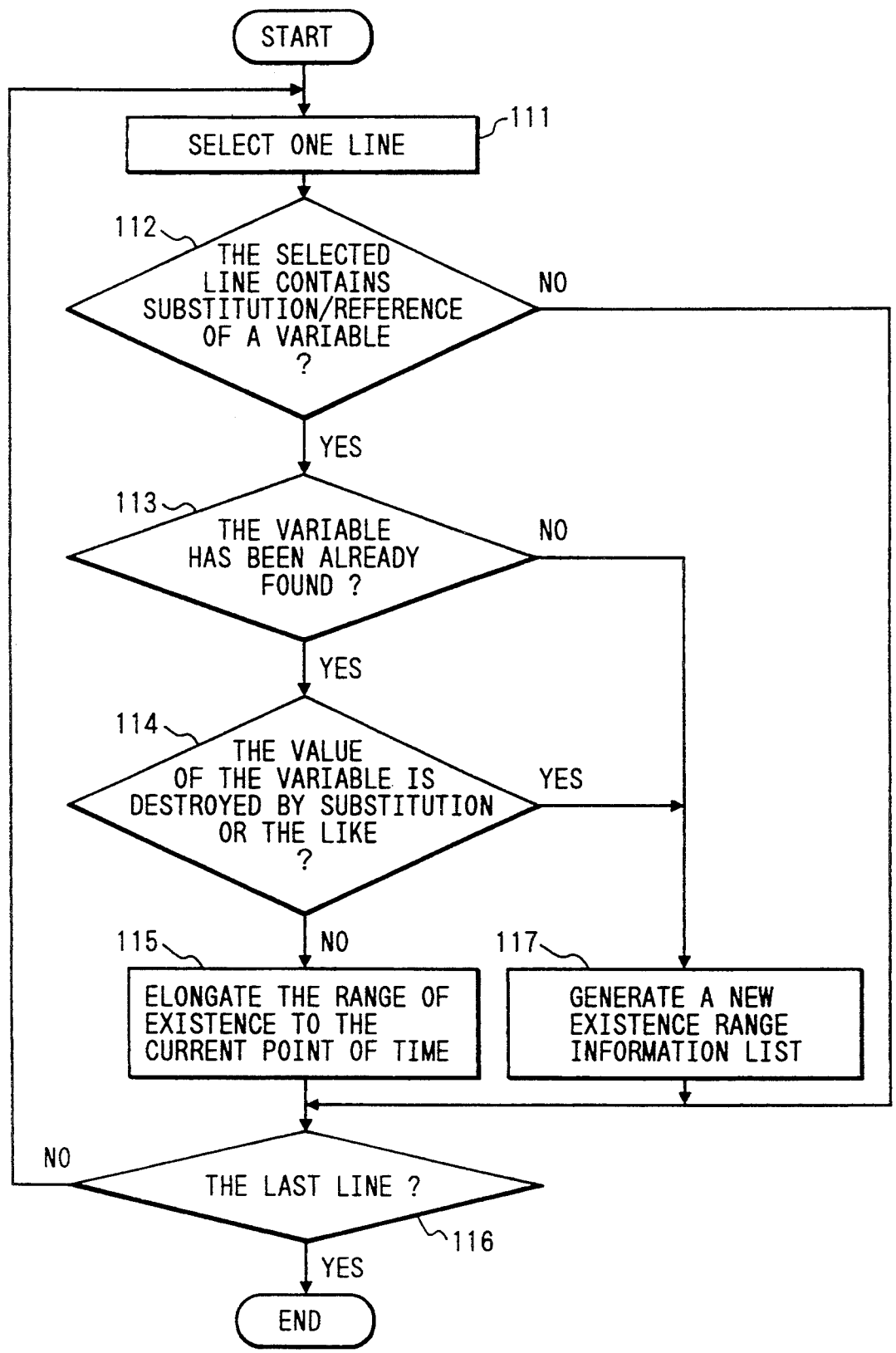
FIG. 10 is a flowchart showing the detail of the procedure for analyzing ranges of existence.

The detailed procedure in the existence range detection portion 11 for examining existence range information in the block selected in Step 110 in FIG. 9 is shown in FIG. 10.

The existence range detection portion 11 selects one line from the head of the basic block (Step 111), judges whether the selected line contains substitution/reference of a variable (Step 112), judges whether the line is the last line when the line contains no substitution/reference (Step 116), and selects the next line again when the line is not the last line (Step 111).

When a decision is made in Step 112 that the selected line contains substitution/reference of a variable, the existence range detection portion 11 judges with reference to the existence range information list shown in FIG. 17 whether the variable has been already found (Step 113).

If the variable has just been found, a new range of existence is added to the existence range information list (Step 117). The data added herein are "assigned variable name" (used for examination in Step 113), "range starting basic block number", "range end basic block number" (in which the initial value is the same as the initial value of the range starting block number), "range starting line number", "range end line number" (in which the initial value is the same as the initial value of the range starting line number), "address of the next list" (which is zero if the next list is not existent), "address of the previous list" (address of the list for reference of the currently generated list), and "address of the next list in the previous list" (in which the address of the currently generated list is put).

Thereafter, a judgment is made as to whether the line is the last line of the block (Step 116). If the line is not the last line, the next line is selected again (Step 111). When a decision is made in Step 113 that the line has been already found, a judgment is made as to whether the value of the variable is destroyed by substitution or the like (Step 114). If the value of the variable is destroyed, the range of existence is considered to be finished at the point of time of the last reference of the variable so that a new existence range information list is generated in the same manner as described above (Step 117). If the value of the variable is not destroyed, the range of existence in the (finally updated) list concerning the split regions of the variable is elongated or extended to the current point of time (Step 115). That is, the range end basic block number and the range end line number in the final list having the currently noticeable variable as the assigned variable name are updated. This procedure is repeated until the line becomes the last line of the block.

Figure 11:
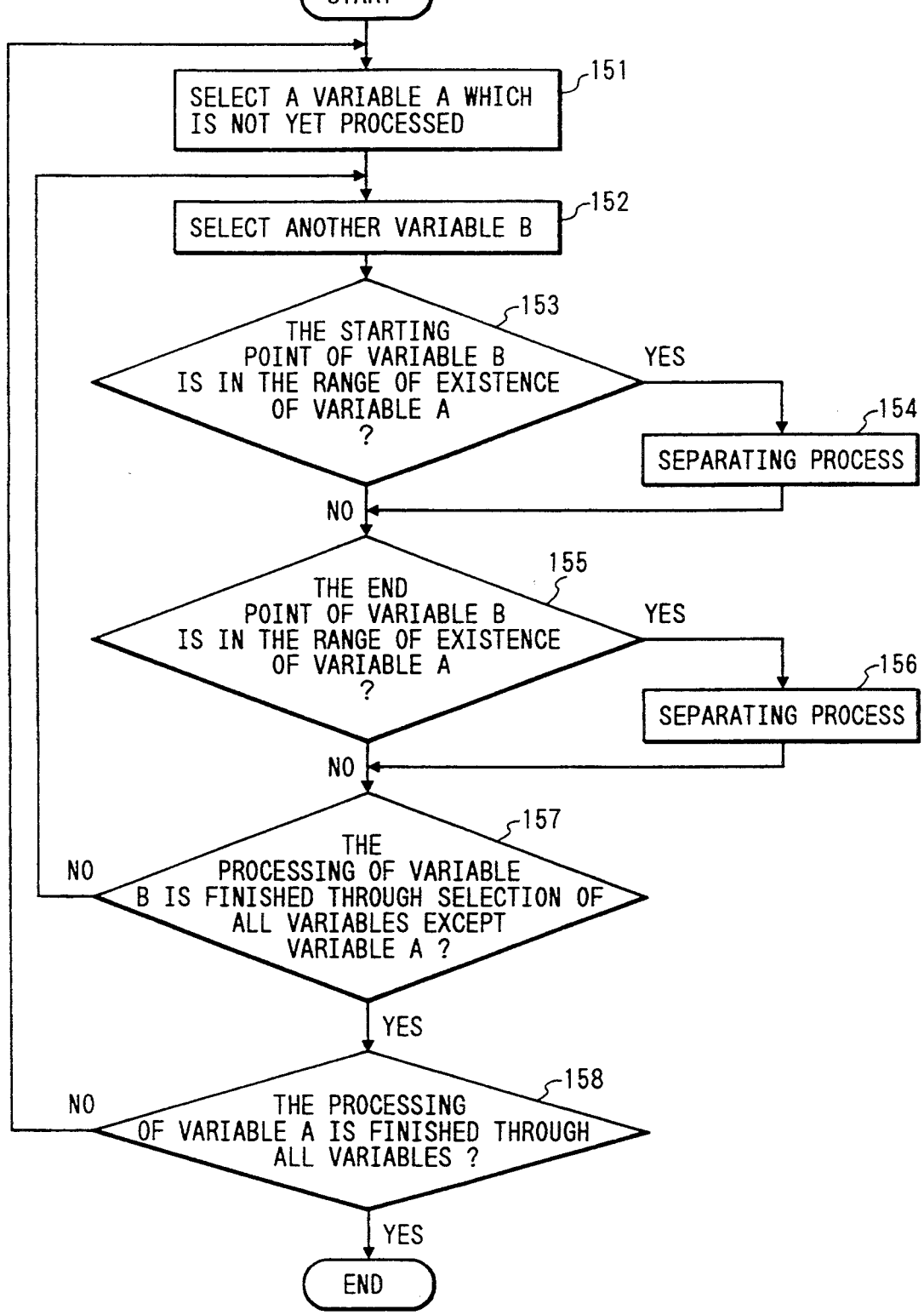
FIG. 11 is a flowchart showing a procedure for performing separation.
Figure 12:
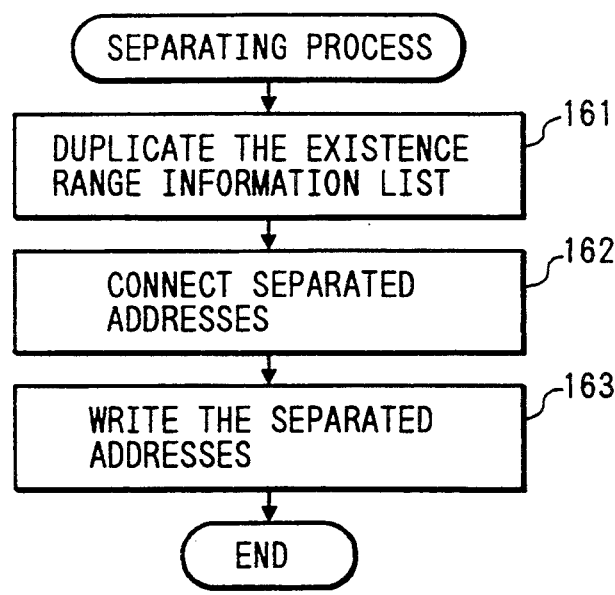
FIG. 12 is a flowchart showing a part of the procedure for performing separation.

After the ranges of existence are analyzed by the existence range detection portion 11 as described above, the ranges of existence are separated by the existence range separation portion 12. The procedure for separation is shown in FIGS. 11 and 12. That is, a variable A which is not yet processed is selected (Step 151), and, at the same time, another variable B is selected (Step 152). A judgment is made as to whether the starting point of the range of existence of the variable B is in the range of existence of the selected variable A (Step 153). The starting point of the range of existence is expressed by a combination of the range starting block number and the range starting line number in the existence range information list as shown in FIG. 17. When the starting point of the range of existence of the variable B is in the range of existence of the variable A, a separating process (which will be described later) as shown in FIG. 12 is carried out (Step 154). A judgment is made as to whether the end point of the range of existence of the variable B is in the range of existence of the selected variable A (Step 155). The end point of the range of existence is expressed by a combination of the range end block number and the range end line number in the existence range information list. When the end point of the range of existence of the variable B is in the range of existence of the variable A, a separating process (which will be described later) as shown in FIG. 12 is carried out (Step 156). A judgment is made as to whether the processing of the variable B is finished through selection of all variables except the variable A (Step 157). If the processing of the variable B is not finished, the procedure from Step 152 to Step 157 is repeated. Thereafter, a judgment is made as to whether the processing of the variable A is finished through all variables (Step 158). If the processing of the variable A is not finished, the procedure from Step 151 to Step 158 is repeated. When the processing of the variable A is finished through all variables, separation of all ranges of existence is finished.

The separating process in Steps 154 and 156 will be described hereunder with reference to FIGS. 12 and 18.

The existence range information list 180 of the variable A is duplicated to prepare two existence range information lists 180' (=180) and 181 (Step 161). To use the two existence range information lists as after-separation existence range information lists 180' and 181, separated addresses are connected (Step 162), and at the same time, the separated addresses are written (Step 163).

That is, as shown in FIG. 18, the range end block number and the range end line number in one existence range information list 180' are respectively replaced by the block number and the line number at the separation point and, at the same time, the address in the other list thus duplicated is put in the address in the next list. Further, the range starting block number and the range starting line number in the other existence range information list 181 are respectively replaced by the block number and the line number at the separation point and, at the same time, "the address of the previous list" in the list connected as "the next list" up to now is updated to the address before separation.

Figure 13:
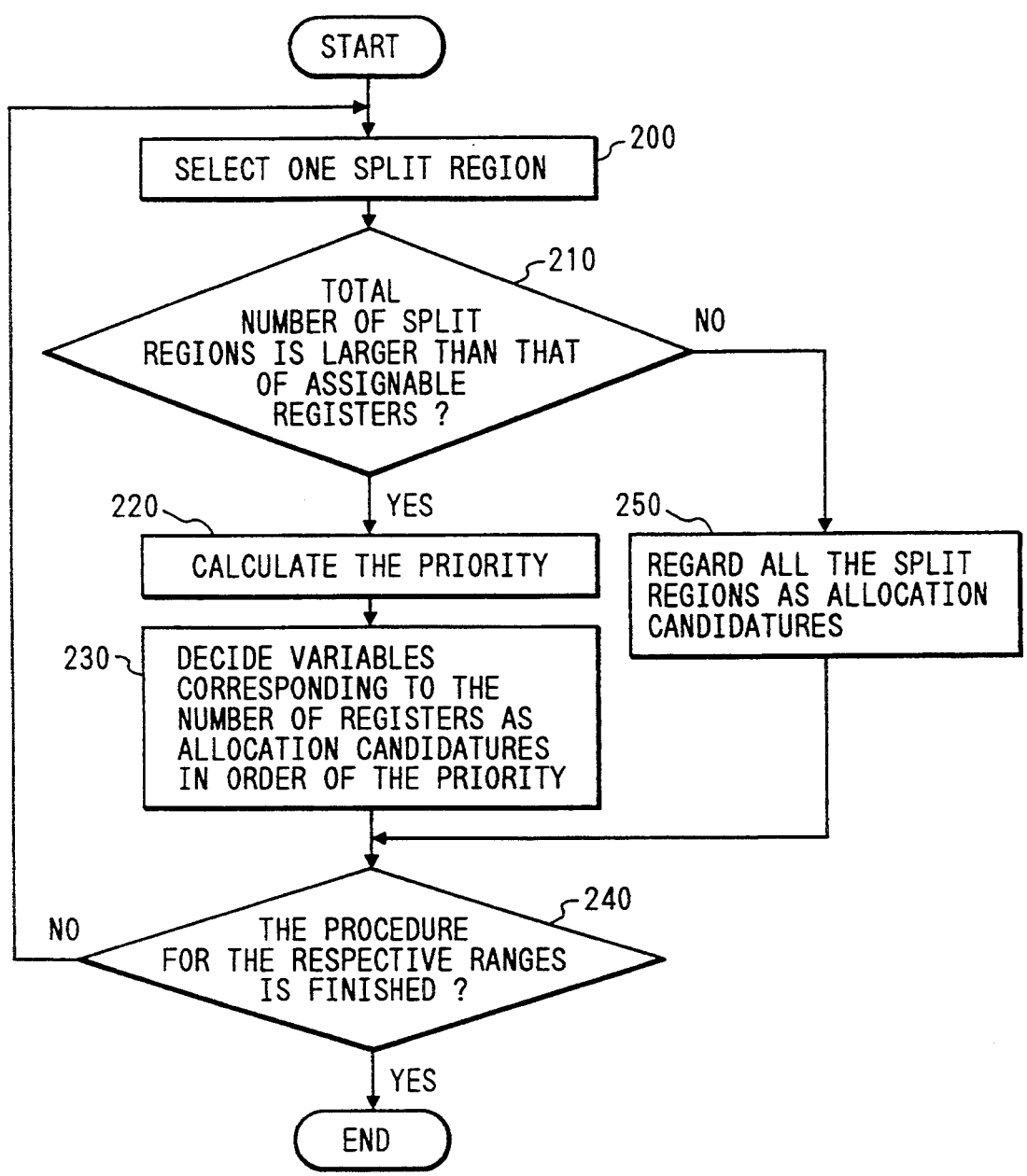
FIG. 13 is a flowchart showing a procedure for selecting candidatures allocated to registers from split regions of variables obtained by separating ranges of existence of the variables.

The allocation candidature selecting procedure for the split regions of the respective ranges of existence in the register allocation portion 13 and the priority calculating procedure in the priority calculation portion 131 will be described hereunder with reference to the flowcharts shown in FIGS. 13 and 14.

One split region of existence is selected (Step 200). In the split region of existence, the total number of variables to be assigned is compared with the total number of assignable registers (Step 210). If the comparison has the result that the total number of allocatable registers is not larger than the total number of variables to be assigned, it is unconditionally considered that the split regions of all variables can be assigned and that all the split regions of the variables in the range of existence are regarded as allocation candidatures (Step 250). If the comparison has the result that the total number of split regions is larger than the total number of assignable registers, the priority of the split regions of the variables is calculated by the procedure as shown in FIG. 14 (Step 220), and variables corresponding to the number of registers are decided as allocation candidatures in order of the priority (Step 230). The allocation procedure is repeated for the respective ranges of existence until the procedure for the respective ranges of existence is finished (Step 240).

Figure 14:
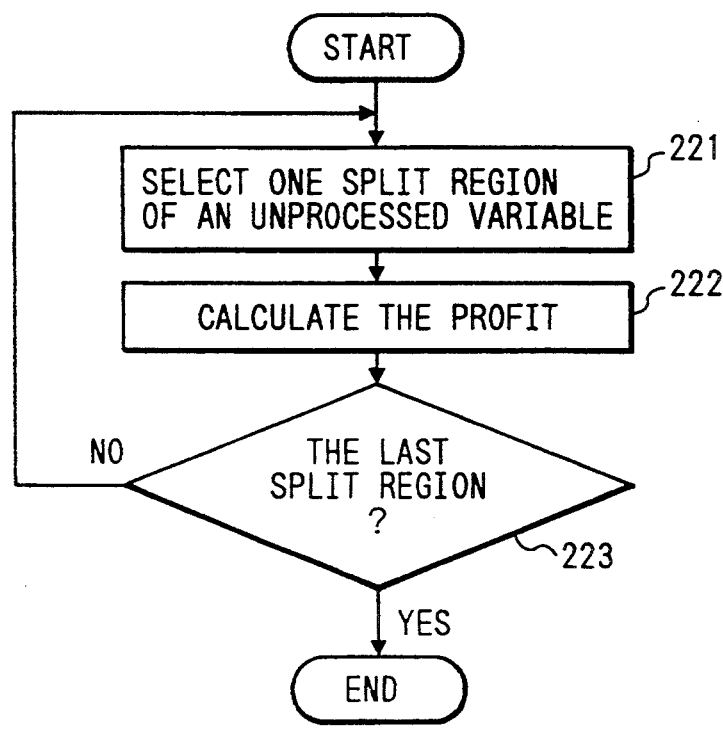
FIG. 14 is a flowchart showing a procedure for calculating priority.

The priority calculation in Step 230 is carried out as shown in FIG. 14.

One split region of an unprocessed variable in a separated range is selected (Step 221), the profit thereof is calculated (Step 222), and the aforementioned steps are repeated until the calculation for the last split region is finished (Step 223).

Here, the profit is evaluated as follows.

$$\text{profit} = (\text{loading profit}) \times (\text{the number of times of reference in the separated range of existence}) + (\text{storing profit}) \times (\text{the number of times of substitution in the separated range of existence}) - (\text{moving cost}) \times n \quad (1)$$

Loading Profit: Execution time saved in the case where a variable is placed in a register, as compared with the reference of a corresponding memory.

Storing Profit: Execution time saved in the case where a variable is placed in a register, as compared with the case where the variable is stored in a corresponding memory.

Moving Cost: Cost required for moving a variable from a memory to a register or from a register to a memory.

n: The number of times of moving the value of a variable from a memory (or to a memory). Although a judgment is not yet made as to whether the next unprocessed variable can be assigned to a register, the number n is regarded as zero if a certain next unallocated split region is present. In any case, the number n may take a value of 0, 1 and 2.

Figure 15:
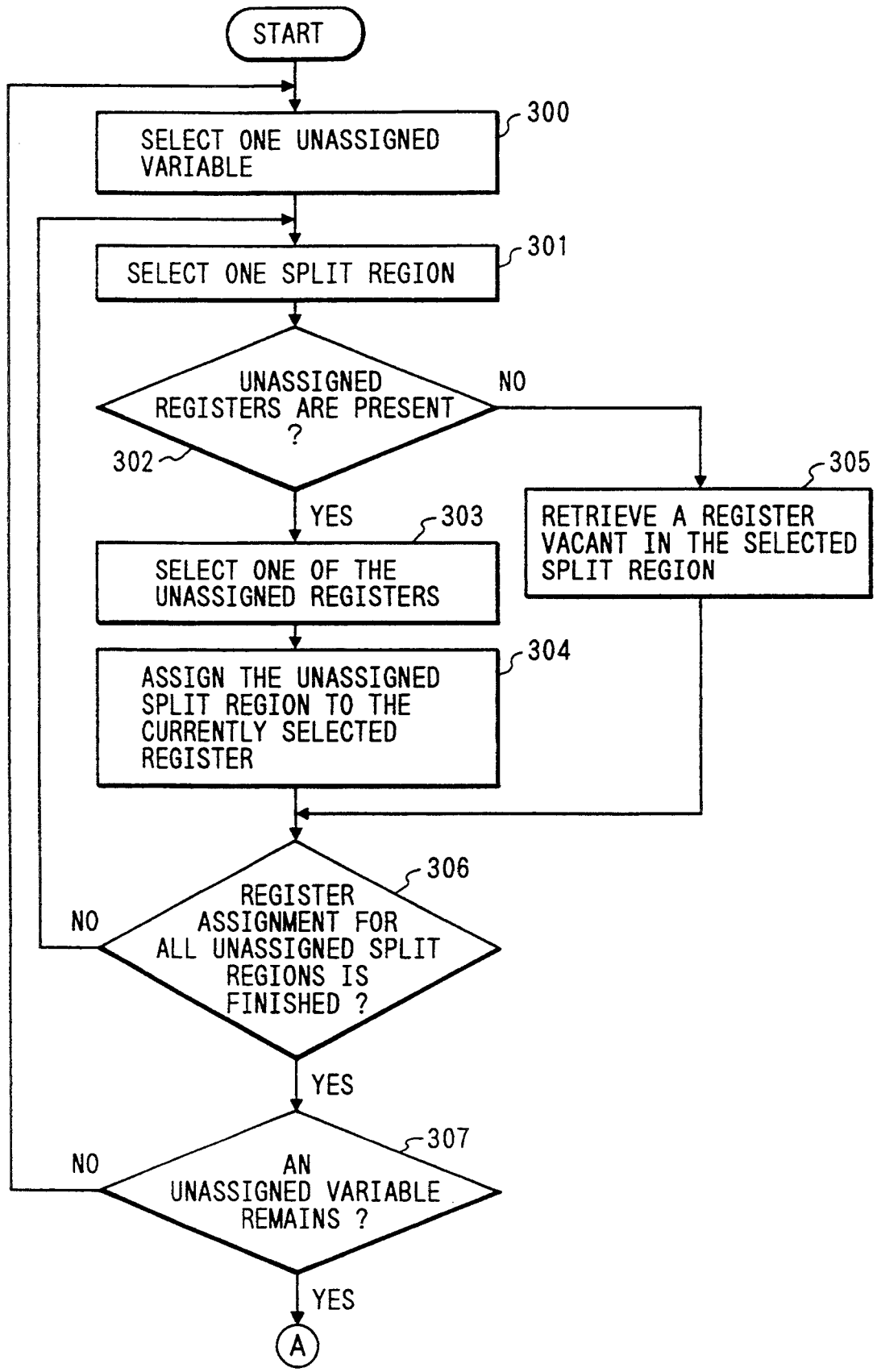
FIG. 15 is a flowchart showing a register assignment procedure.

Finally, the register assignment procedure in the register assignment portion 14 will be described hereunder with reference to FIGS. 15 and 16.

One unassigned variable is selected and the processing of all split regions belonging to the variable is started (Step 300). One split region in the range of existence belonging to the selected variable is selected (Step 301). A judgment is made as to whether unassigned registers are present (Step 302). If unassigned registers are present, one of the unassigned registers is selected (Step 303). The unassigned split region thus selected are assigned to the currently selected register (Step 304). If a decision is made in Step 302 that there is no unassigned register, a register vacant in the selected split region of existence is retrieved and assigned for the split region (Step 305). The aforementioned steps are repeated until register assignment for all unassigned split regions is finished (Step 306).

When the second split region of one variable or the split region after the second split region is processed, the following procedure is carried out.

A judgment is made as to whether a register has been selected instead of whether an unassigned register is present (Step 302), and if a register has been selected, the register is used (Step 303). After the aforementioned procedure for all split regions is finished, a judgment is made as to whether an unassigned variable remains (Step 307). The aforementioned procedure is repeated for all variables and for all split regions.

Thereafter, with respect to isolated split regions among the split regions unconditionally decided, in Step 250, as allocation candidatures, because the number of variables existing in a split region of existence is smaller than the number of registers, a procedure of withdrawing assignment is carried out in the case where there is no profit brought by assignment of the isolated split regions. FIG. 16 is a flowchart of the assignment withdrawal procedure.

One split region that is not subjected to priority calculation is selected (Step 308). A judgment is made as to whether a split region adjacent to the selected split region belongs to the same variable (Step 309). On the basis of this judgment, a judgment is made as to whether the selected split region is an isolated split region. If the selected split region is not an isolated split region, the assignment in Step 250 is settled. If the selected split region is an isolated split region, the profit brought by placing the isolated split region in a register is calculated (Step 310) according to the following expression.

$$(\text{profit brought by placing it in a register}) = (\text{loading profit}) \times (\text{the number of times of reference}) + (\text{storing profit}) \times (\text{the number of times of substitution}) - 2 \times (\text{moving cost}) \quad (2)$$

A judgment is made by calculation according to the expression (2) as to whether the profit is effective (Step 311). When the result of calculation according to the expression (2) is a positive value, a decision is made that the profit is effective. When the result of calculation according to the expression (2) is zero or a negative value, a decision is made that the profit is ineffective. When a decision is made that the profit is effective, the assignment is settled. When a decision is made that the profit is ineffective, the register assigned for the split region in Step 250 is withdrawn from assignment (Step 312). The aforementioned steps are repeated for all split regions unconditionally decided as allocation candidatures (Step 313). Even if a register is vacant in the split region of existence, is not necessary because the number of registers is sufficient such that all split regions except the split region can be assigned to registers.

SECOND EMBODIMENT

Figure 19:
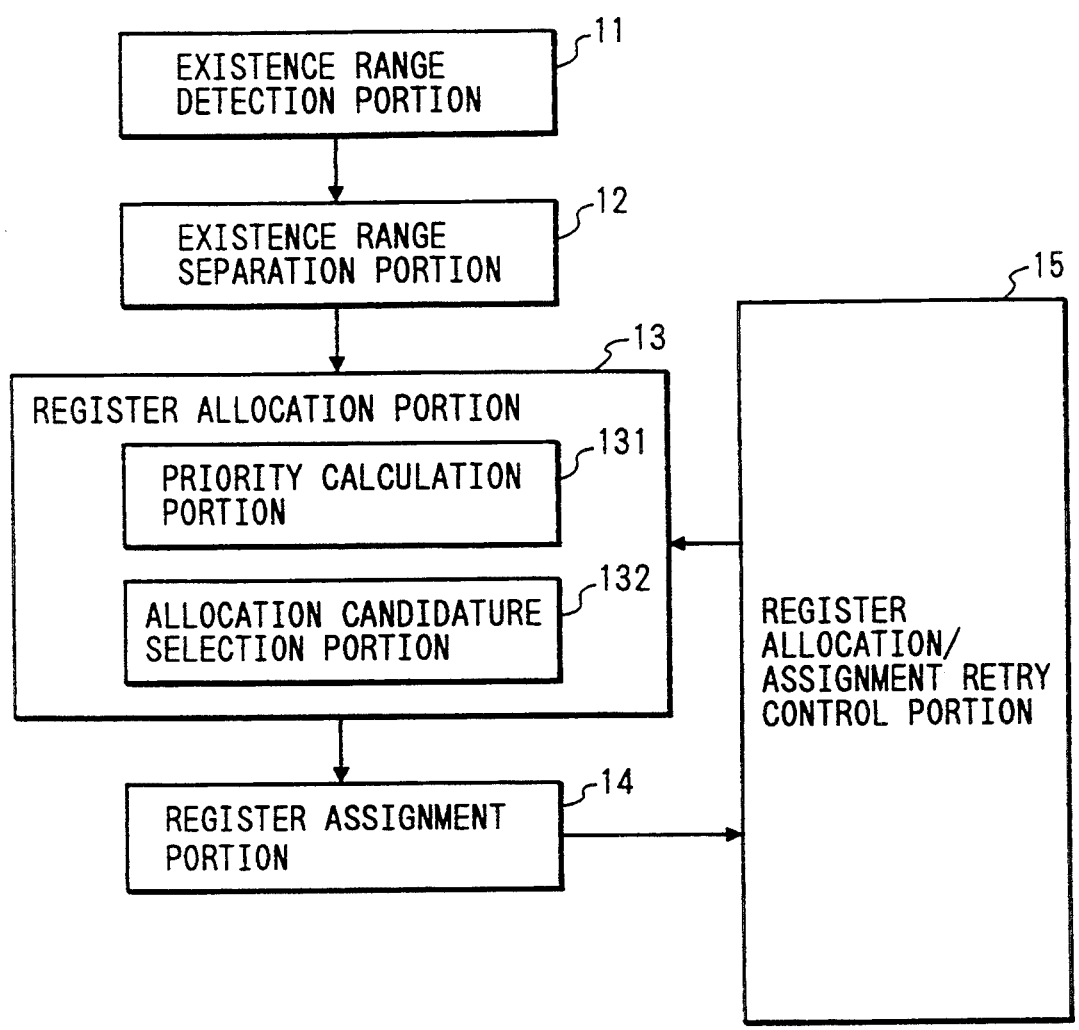
FIG. 19 is a block diagram showing the configuration of a second embodiment of the present invention.
Figure 20:
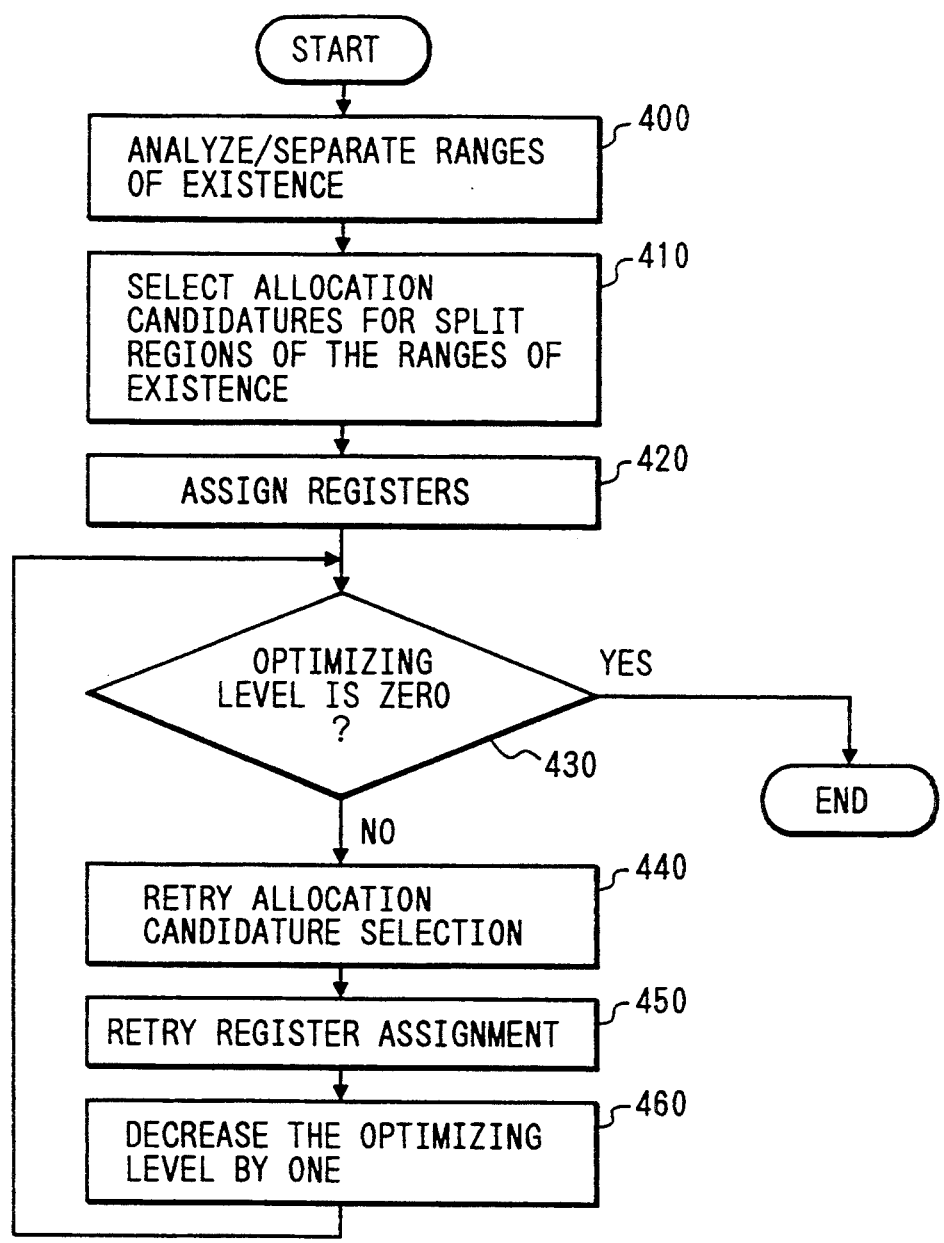
FIG. 20 is a flowchart showing a procedure in the second embodiment.

FIG. 19 is a block diagram showing the construction of a second embodiment of the present invention. FIG. 20 is a flowchart showing a procedure in the second embodiment.

As shown in FIG. 19, the second embodiment is different from the first embodiment in that a register allocation/assignment retry control portion 15 for retrying the register allocation portion 13 and the register assignment portion 14 is added to the construction of the first embodiment to thereby increase the number of optimizing levels. The execution time of generated codes can be shortened by increasing the number of optimizing levels, though the compiling time is lengthened.

As shown in FIG. 20, the procedure from Step 400 to Step 420 is the same as in the first embodiment.

The analysis/separation of ranges of existence (Step 400), the selection of allocation candidatures for split regions of the ranges of existence (Step 410), and the register assignment (Step 420) are the same as in the first embodiment. However, the second embodiment is different from the first embodiment in the following procedure controlled by the register allocation/assignment retry control portion 15.

When a user uses this translating apparatus, an optimizing level can be selected. For example, optimizing level 1 expresses assembler-level optimization, and optimizing level 2 expresses optimization such as wide-range optimization, common partial expression erasing optimization, etc.

A judgment is made as to whether the optimizing level is zero or not (Step 430). If the optimizing level is zero, the procedure is terminated because the procedure for the optimizing level designated by the user is finished. If the optimizing level is not zero, register allocation for performing both priority re-calculation and allocation candidature selection is retried (Step 440), and, at the same time, register assignment is retried (Step 450). Thereafter, the value of the optimizing level is decreased by one (Step 460) and then the situation of the procedure goes to Step 430.

The aforementioned steps are repeated under the control of the register allocation/assignment retry control portion 15. When, for example, the optimizing level designated is 2, the loop is repeated twice.

Although the assignment candidature re-selection in Step 440 and the register re-allocation in Step 450 are respectively carried out in the same manner as the allocation candidature selection in split regions of the respective ranges of existence in Step 410 and the register allocation in Step 420, a decision has been made at the time of the previous register allocation as to whether the following split region can be allocated to a register. Accordingly, the value of n in the priority calculation (expression (1)) in FIG. 14 is decided by using the result of the decision. Accordingly, priority can be decided more accurately.

As described above, according to the present invention, register allocation/assignment is performed on the basis of priority decided by: separating all the ranges of existence of respective variables at starting points and end points thereof; and calculating profits brought by allocating the separated ranges of existence to registers. Accordingly, even if a variable has a long range of existence such that the whole range thereof must be assigned by the conventional register allocation techniques, register assignment to attain best efficiency can be made by the invention through calculating profits brought by register assignment for every split region without necessarily of assigning the whole range for the variable. When, for example, a variable is partly high in frequency of use and partly low in frequency of use, register assignment based on priority under the consideration of efficiency is performed so that another variable is assigned for the part of the variable being low in frequency of use. Accordingly, in the present invention, registers can be used effectively to improve the efficiency in execution of the thus generated object codes and improve the performance of the computer for executing the object codes.

Further, one of the merits attained by the present invention is an improvement of the instruction scheduling efficiency (reference is made to "Information Processing", Vol. 31, No. 6, page 732, and the like as to the instruction scheduling).

In the instruction scheduling, scheduling is made while freely changing the instruction sequence to improve the efficiency in execution of hardware in the case where it is found by examining the dependence of instructions on one another that the change in the instruction sequence has no influence on the result of calculation. As a result, the range of existence of each variable is generally extended, so that one variable occupies a large part of a register in the conventional register assignment techniques. Accordingly, in the conventional register assignment techniques, the efficiency in execution of generated object codes often becomes poor.

Therefore, in the prior art, such instruction scheduling is performed after register assignment. As a result, the dependence of respective instructions on one another becomes stronger than that before register assignment. When, for example, two variables assigned to different pseudo registers at the time of generating intermediate codes are assigned to one register by register assignment, dependence occurs between the two variables at that point of time. Accordingly, free instruction scheduling cannot be made, so that object codes of high efficiency cannot be generated.

In this point of view, in the case of the present invention, an improvement of the instruction scheduling efficiency can be attained by performing instruction scheduling before assigning split regions of a range of each variable to registers even if the range of existence of the variable may be extended as a result of instruction scheduling.

What is claimed is:

1. A program translating apparatus comprising:
   detection means for detecting variable starting points and variable ending points in ranges of existence of variables in a same period of time, said detection means examining said ranges of existence of said variables one by one;
   separation means for separating said ranges of existence of said variables at said variable starting points and variable ending points detected by said detection means;

register allocation means for selecting candidatures for split regions permanently allocated to registers by determining profits when the split regions obtained by separating said ranges of existence of said variables, being different and existing in the same period of time, are respectively allocated to the registers; and register assignment means for permanently assigning registers for said candidatures for the split regions selected by said register allocation means.

2. A program translating apparatus comprising:

a detection portion for detecting variable starting points and variable ending points in ranges of existence of variables in a same period of time, said detection portion examining said ranges of existence of said variables one by one;

a separation portion for separating said ranges of existence of said variables at said variable starting points and variable ending points detected by said detection portion;

a register allocation portion for selecting candidatures for split regions permanently allocated to registers by determining profits when the split regions obtained by separating said ranges of existence of said variables, being different and existing in the same period of time, are respectively allocated to the registers and by determining a priority for the register allocation of the split regions; and a register assignment portion for permanently assigning registers for said candidatures for the split regions selected by said register allocation portion.

3. A program translating apparatus according to claim 2, wherein said register allocation portion includes a priority calculation portion for calculating the priority for the register allocation of the split regions, and an allocation candidature selection portion for selecting the candidatures for the split regions permanently allocated to the registers.

4. A program translating apparatus comprising:

a detection portion for detecting variable starting points and variable ending points in ranges of existence of variables in a same period of time, said detection portion examining said ranges of existence of said variables one by one;

a separation portion for separating said ranges of existence of said variables at said variable starting points and variable ending points detected by said detection portion;

a register allocation portion for selecting candidatures for split regions permanently allocated to registers by determining profits when the split regions obtained by separating said ranges of existence of said variables, being different and existing in the same period of time, are respectively allocated to the registers and by determining a priority for the register allocation of the split regions;

a register assignment portion for permanently assigning registers for said candidatures for the split regions selected by said register allocation portion; and a register allocation and assignment retry control portion for retrying said register allocation portion and said register assignment portion.

5. A program translating apparatus according to claim 4, wherein said register allocation portion includes a priority calculation portion for calculating the priority for the register allocation of the split regions, and an allocation candidature selection portion for selecting the candidatures for the split regions permanently allocated to the registers.

* * * * *